(12) United States Patent
Courtay

(10) Patent No.: US 8,464,355 B2
(45) Date of Patent: Jun. 11, 2013

(54) METHOD AND DEVICE FOR EXCHANGING DIGITAL CONTENT LICENSES

(75) Inventor: Olivier Courtay, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/452,425

(22) PCT Filed: Jun. 24, 2008

(86) PCT No.: PCT/EP2008/058041
§ 371 (c)(1),
(2), (4) Date: Dec. 29, 2009

(87) PCT Pub. No.: WO2009/003883
PCT Pub. Date: Jan. 8, 2009

(65) Prior Publication Data
US 2010/0146630 A1    Jun. 10, 2010

(30) Foreign Application Priority Data
Jun. 29, 2007  (EP) .................................... 07301185

(51) Int. Cl.
*G06F 21/00* (2006.01)
(52) U.S. Cl.
USPC ............... 726/27; 726/26; 380/201; 380/202; 380/203; 380/204; 705/57
(58) Field of Classification Search
USPC .................. 726/26, 27; 380/201–204; 705/57
See application file for complete search history.

(56) References Cited

U.S. PATENT DOCUMENTS

| 2001/0032312 A1* | 10/2001 | Runje et al. .................. 713/172 |
| 2002/0152393 A1* | 10/2002 | Thoma et al. ................. 713/189 |
| 2004/0133448 A1* | 7/2004 | Higashi et al. .................... 705/1 |
| 2005/0080746 A1* | 4/2005 | Zhu et al. ......................... 705/59 |
| 2006/0107046 A1* | 5/2006 | Raley et al. .................... 713/168 |
| 2006/0212405 A1* | 9/2006 | Gordon et al. .................. 705/59 |
| 2007/0043680 A1* | 2/2007 | Fox et al. ......................... 705/59 |
| 2007/0112681 A1* | 5/2007 | Niwano et al. .................. 705/59 |
| 2007/0124248 A1* | 5/2007 | Stoker ............................. 705/51 |

FOREIGN PATENT DOCUMENTS

| WO | WO 2004/093062 | 10/2004 |
| WO | WO 2004/093062 A2 * | 10/2004 |
| WO | WO 2006/054988 | 5/2006 |
| WO | WO 2006/054988 A2 * | 5/2006 |
| WO | WO 2006/054988 A2 * | 5/2006 |

OTHER PUBLICATIONS

Search Report Dated Oct. 31, 2008.

* cited by examiner

*Primary Examiner* — Andy Rao
*Assistant Examiner* — Shan Elahi
(74) *Attorney, Agent, or Firm* — Tutunjian & Bittetto, P.C.

(57) ABSTRACT

Exchange of Digital Rights Management protected content between two devices without the need for a third party. Each user marks a license as unusable and the devices the trade licenses. A user then instructs the device to import the received license. The device verifies that a license has been rendered unusable and only then erases the unusable license and enables the device to use the new license. The content associated with a license may be traded before or after the license exchange, and may also be downloaded from a third party. Also provided is a device for exchanging licenses.

11 Claims, 1 Drawing Sheet

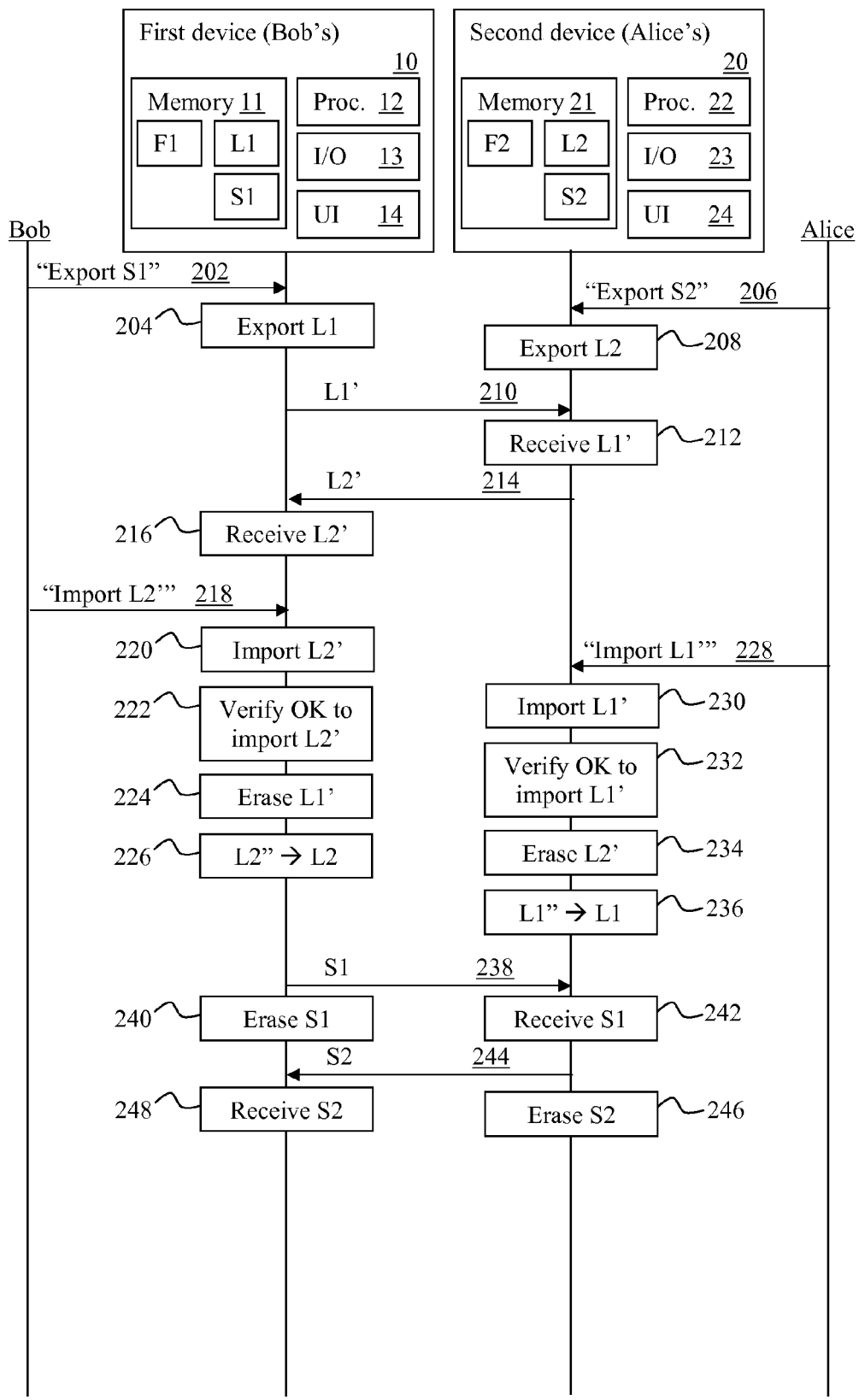

METHOD AND DEVICE FOR EXCHANGING DIGITAL CONTENT LICENSES

This application claims the benefit, under 35 U.S.C. §365 of International Application PCT/EP2008/058041, filed Jun. 24, 2008, which was published in accordance with PCT Article 21(2) on Jan. 8, 2009 in English and which claims the benefit of European patent application No. 07301185.0, filed on Jun. 29, 2007.

FIELD OF THE INVENTION

The present invention is generally directed to digital content, and in particular to digital content in Digital Rights Management (DRM) systems.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Today, there are several DRM systems that allow users to download digital content, such as songs, to a player. Each content item is associated with a license that is needed to access the content.

From a user point of view, a drawback of prior art DRM systems is that it is not possible for two users to exchange content. It will be appreciated that this would be of benefit to the users. If, for example, user A has tired of a song that user B likes and vice versa, it would be interesting for both users to simply switch songs.

Furthermore, when exchanging licenses, a user is likely to want some assurance that his license will not be stolen, i.e. that the user gives away his license without receiving anything in return as agreed with another user. The present invention can help provide such assurance.

In addition, the skilled person will appreciate that it is advantageous to enable such exchange without involving a third party, such as a central server.

At present, though, no such solutions exist and it is an object of the present invention to provide a solution that enables users to swap DRM protected digital content.

SUMMARY OF THE INVENTION

In a first aspect, the invention is directed to a method of exchanging a first license for a first item of digital content against a second license for a second item of digital content. A first device, storing the first license, receives the second license from a second device; and, if the first license has been rendered unusable to the first device, erases the first license and makes the second license usable by the first device.

In a preferred embodiment, the first device verifies that the first license has been sent from the first device. It is advantageous that the first device also verifies that the first license has been sent to the second device.

In a further preferred embodiment, the first device also receives, just after the reception of the second license, a user instruction to import the second license.

In a further preferred embodiment, the first device also sends to the second device the first license that has been made unusable to the first device. It is advantageous that the first device first receives a user instruction to render the first license unusable to the first device.

In another preferred embodiment, the first device also receives, prior to the verification, a user instruction to import the second license.

In yet another preferred embodiment, the first device also sends the first item of content to the second device and erases the first item of content.

In yet a further preferred embodiment, the first device also receives the second item of content; and stores the second item of content.

In a second aspect, the invention is directed to a device for exchanging a first license for a first item of digital content against a second license for a second item of digital content. The device comprises a memory adapted to store a plurality of licenses and an interface adapted to receive the second license from a second device. The device also comprises a processor adapted to verify that the first license has been rendered unusable to the first device; and, in case of positive verification, erase the first license from the memory and make the second license usable by the first device.

In a preferred embodiment, the processor is further adapted to verify that the first license has been sent to the second device.

In a further preferred embodiment, the device further comprises a user interface adapted for communication with the user.

BRIEF DESCRIPTION OF THE DRAWINGS

Preferred features of the present invention will now be described, by way of example, with reference to the accompanying drawing, in which FIG. 1 illustrates a signal flow chart of a method of exchanging DRM protected digital content according to a preferred embodiment of the invention.

DETAILED DESCRIPTION OF PREFERRED EMBODIMENTS

FIG. 1 is a signal flow chart of a method of exchanging licenses for DRM protected digital content (hereinafter "content") according to a preferred embodiment of the invention.

The method has four actors: a first user, Bob, who has a first device 10, and a second user, Alice, who has a second device 20. Each device 10, 20 comprises:
- a functional memory space 11, 21 for storing digital information, such as content,
- processing means 12, 22 (hereinafter "processor") that may be embodied in one or more physical processors,
- an interface 13, 23 for communicating with the DRM provider and/or another device, and
- a user interface 14, 24.

Each memory space 11, 21 stores a license file F1, F2 with information on the capabilities (permissions, if you like) of the device to access the content corresponding to different licenses. According a preferred embodiment of the invention, there are three types of license: normal license, for content which can be normally accessed (e.g. played) by the device, exported license, and received license. The content linked to exported and received licenses cannot normally be played by the device and the use of these licenses will be further explained hereinafter.

Now, imagine that Bob has a Beatles song S1 on his device 10 and that the has tired of this song. Imagine further that Alice has a Madness song S2 on her device 20 and that she has tired of this song. Finally, imagine that Bob and Alice want to exchange songs and that their songs have been provided by the same system, or at least that the songs are protected by compatible DRM systems. The skilled person will appreciate that the method may be used to trade other kinds of content than songs.

To start the method, one of the users—in this case Bob—uses the user interface 14 to select his Beatles song S1 and mark 202 it as exported in the license file F1. The processor 12 changes 204 the license L1 associated to this song from normal license to exported license L1'. After this, Bob's device 10 is not able to play the Beatles song S1, i.e. the exported license is unusable to the device. In the simplest embodiment, this is done by setting a particular bit in the license header, but other more elaborate ways that further protect the exported license, for example by encryption, may also be employed.

Alice does the same with her Madness song S2: she selects and marks 206 it, and the processor 22 changes 208 the license L2 to exported license L2' in the license file F2. It should be noted that Alice may do this in parallel with Bob.

Bob's device 10 then sends 210 the exported license L1' to Alice's device 20 that receives 212 the exported license. Similarly, Alice's device 20 then sends 214 the exported license L2' to Bob's device 10 that receives 216 the exported license as a corresponding received license L2". Any suitable way of transmission the data may be used, such as for example infra-red link, Internet, USB token, Bluetooth™ link, and direct cable. In one embodiment where the devices are securely connected (e.g. by cable) to a single device, each license is automatically sent to the other device. However, in an alternate embodiment, it may be advantageous for the user to instruct the device to send the license.

The exported license is preferably self-protected; the network layer is not constraint. In other words, when the exported license is protected, simply copying the transferred file is not sufficient, as it needs to be unprotected, which as will be seen hereinafter, preferably is done only when a device has established that it has sent another license in exchange for the then received license.

Bob then preferably instructs 218 his device 10 to import 220 the received Madness license file L2". Before importing the received license file L2", the processor 12 checks 222 that at least one license present on the device is marked as exported, and preferably that the license has been sent to another device (and it is advantageously checked, if possible, that the license file has been sent to Alice's device 20). If this is true, the processor 12 deletes 224 the exported license L1' and changes 226 the received license L2" to normal license L2, if necessary by unprotecting it, as described hereinbefore.

The same steps are performed on Alice's side: instruction 228 to import 230 the license L1' associated with the Beatles song S1, the processor 22 checks 232 that a license has been exported before deleting 234 the exported license L2' and changing 236 the imported license L1" to a normal license L1. Once again, it should be noted that Alice may do this in parallel with Bob.

The skilled person will appreciate that the method described only switches licenses between devices. In one embodiment, a license file also comprises the content.

The preferred embodiment, however, separates content S from the associated license L. In fact, there is no set moment during which the content S must be transferred. As the content is unusable without the license it may thus be freely distributed. The content may thus be copied from one device to another before the method transferring the licenses begins or after the same method, but it will be appreciated that the content may also be downloaded from a third entity, such as the content owner, either before or after the transfer of the licenses. In the preferred embodiment, it is preferred that the content file is erased when a device no longer has any use for it. An example of this is illustrated in FIG. 1. Bob's device 10 sends 238 the Beatles song S1 to Alice's device 20 and erases 240 the content file S1. Alice's device 20 receives 242 the Beatles song and stores it, sends 244 the Madness song S2 to Bob's device 10 and erases 246 the content file S2. Bob's device 10 receives 248 the Madness song and stores it.

After these steps (and once the songs have are available on the devices), Bob can play the Madness song S2 on his device 10 and Alice can play the Beatles song S1 on her device 20, but neither device can play the song that was traded with the other device.

As will be appreciated, the present invention enables exchange of DRM protected content between content consumer devices. An advantage is that the exchange may be performed by two devices without involvement of a third device or a central server. It will also be appreciated that the method can increase user trust when exchanging licenses if an imported cannot be used unless another license has not been exported.

It will be understood that the present invention has been described purely by way of example. Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of exchanging a first license for a first item of digital content against a second license for a second item of digital content, the method comprising steps, being performed by a processor of a first content player, of:
   storing the first license in a memory of the first content player
   receiving the second license from a second content player;
   verifying that the first license has been rendered unusable to the first content player, and
   if the first license has been rendered unusable to the first content player:
   erasing the first license; and
   making the second license usable by the first content player.

2. The method as claimed in claim 1, further comprising checking that the first license has been sent from the first content player.

3. The method as claimed in claim 2, wherein the checking further comprises checking that the first license has been sent to the second content player.

4. The method as claimed in claim 1, further comprising receiving a user instruction to import the second license after said receiving.

5. The method as claimed in claim 1, further sending the first license, unusable to the first content player, to the second content player.

6. The method of claim 5, further comprising receiving a user instruction to render the first license unusable to the first content player.

7. The method of claim 1, further comprising receiving a user instruction to import the second license just prior to said verifying.

8. The method of claim 1, further comprising:
sending to the second content player the first item of content; and
erasing the first item of content.

9. The method of claim 1, further comprising:
receiving the second item of content; and
storing the second item of content.

10. A first content player for exchanging a first license for a first item of digital content against a second license for a second item of digital content, the first content player comprising:
a memory device configured to store a plurality of licenses;
a user interface configured for communication with a user;
a device interface configured to receive the second license from a second content player, and
a processor configured to:
verify that the first license has been rendered unusable to the first content player; and
in case of positive verification:
erase the first license from the memory device; and
make the second license usable by the first content player.

11. The device as claimed in claim 10, wherein the processor is further configured to verify that the first license has been sent to the second content player.

* * * * *